United States Patent [19]

Muller

[11] 4,083,745

[45] Apr. 11, 1978

[54] APPARATUS FOR PROMOTING THE SETTING OF ADHESIVE ON STACKS OF SHEETS IN BOOKBINDING MACHINES

[75] Inventor: Hans Müller, Zofingen, Switzerland

[73] Assignee: Grapha-Holding AG, Hergiswill, Switzerland

[21] Appl. No.: 705,819

[22] Filed: Jul. 16, 1976

[30] Foreign Application Priority Data

Aug. 21, 1975 Switzerland .................... 010861/75

[51] Int. Cl.² ........................ B32B 19/02; H05B 9/04; B01K 5/00

[52] U.S. Cl. .......................................... 156/380; 34/1; 219/10.81; 156/497; 432/152

[58] Field of Search .......................... 156/380, 498, 7; 219/10.69, 10.81; 11/1 AD; 432/152, 148; 34/1

[56] References Cited

U.S. PATENT DOCUMENTS

| | | | |
|---|---|---|---|
| 2,044,365 | 6/1936 | Pederson | 11/1 AD |
| 3,149,217 | 9/1964 | Reed et al. | 219/10.69 |
| 3,404,462 | 10/1968 | Hanson et al. | 219/10.81 |
| 3,537,185 | 3/1970 | Ingram | 219/10.81 |
| 3,956,053 | 5/1976 | Staats | 156/380 |
| 4,014,732 | 3/1977 | Beckert et al. | 34/1 |

*Primary Examiner*—Douglas J. Drummond
*Attorney, Agent, or Firm*—Peter K. Kontler

[57] ABSTRACT

A bookbinding machine wherein stacks of signatures are transported by the holders of an endless conveyor which moves the stacks seriatim along a paster. The paster coats the backs of successive stacks with wet adhesive and the stacks are thereupon transported through a heating zone where the adhesive is heated in the space between two elongated electrodes of a high-frequency heater. A pipe which extends along the path of stacks in the region of one of the electrodes has orifices which discharge streamlets of preheated air across the path of holders to impinge against successive stacks and to thus prevent scorching of signatures by heat which is generated by the high-frequency heater. The rate of flow of air through the orifices of the pipe is adjustable, and such rate preferably increases in the direction of forward movement of the holders.

9 Claims, 1 Drawing Figure

II
II

APPARATUS FOR PROMOTING THE SETTING OF ADHESIVE ON STACKS OF SHEETS IN BOOKBINDING MACHINES

BACKGROUND OF THE INVENTION

The present invention relates to machines for processing stacks of paper sheets or the like, especially to bookbinding machines of the type wherein the backs of stacked signatures are coated with films of adhesive and the adhesive is thereupon caused to set prior to attachment of book covers.

The backs of stacks of paper sheets in a bookbinding machine are normally provided with adhesive during transport between the jaws of suitable holders which form part of an endless conveyor. If the adhesive is a thermosetting adhesive (e.g., a starch-containing wet glue), the stacks are transported through a drying station which is located downstream of the adhesive-applying station and wherein the adhesive is heated (and its setting promoted) by flames which are obtained as a result of combustion of a gaseous fuel. The heating action of gas flames must be regulated with a high degree of accuracy because the safety factor which is prescribed by authorities is extremely high, i.e., the gas flames are very small and their heating and drying action is limited so that the heating station occupies an inordinately large amount of space, especially if the thermosetting adhesive is used in a high-speed bookbinding machine. Therefore, the heating of thermosetting adhesive with gas flames contributes excessively to the bulk, especially length, of a high-speed bookbinding or analogous machine.

SUMMARY OF THE INVENTION

An object of the invention is to provide a bookbinding or like machine with novel and improved means for effecting rapid, reliable and reproducible setting of adhesive in a small area and by resorting to simple, compact, long-lasting and reliable instrumentalities.

Another object of the invention is to provide a bookbinding or like machine with novel and improved means for effecting rapid drying of thermosetting adhesive which is applied to the backs of stacks of signatures or discrete sheets while such stacks travel with and between pairs of jaws of a transporting device, especially an endless chain conveyor.

A further object of the invention is to provide the machine with novel and improved means for preventing charring or scorching of paper sheets in spite of the intensive heating action of a device which need not utilize a combustible gaseous or liquid fuel.

An additional object of the invention is to provide a bookbinding or like machine with means for regulating the adhesive-drying action with a desired degree of accuracy, either by hand or automatically.

Still another object of the invention is to provide a bookbinding or like machine with a heating device for the backs of stacked paper sheets whose space requirements are but a small fraction of the space requirements of conventional heating devices and whose heating action is at least as satisfactory as that of heretofore known heating devices.

The invention is embodied in a machine for processing stacks which consist of superimposed sheets and selected portions of which are coated with a thermosetting adhesive, such as wet glue which is applied to the backs of stacked signatures in a bookbinding machine. The machine comprises a conveyor including a plurality of holders each of which can support a stack and transports the respective stack in a predetermined direction along a predetermined path (preferably along an endless path), means for promoting the setting of adhesive on the stacks in the predetermined path including a high-frequency heating device (also called electronic heater) having electrode means adjacent to a predetermined elongated section of the path (the electrode means preferably includes two spaced-apart parallel electrodes located at the opposite sides of the path section and a high-frequency generator connected with the electrodes) so that the stacks act as the dielectric and their selected portions undergo a pronounced heating action which results in rapid setting of the adhesive, and conditioning means including means for establishing and maintaining a stream or curtain of a gaseous fluid which flows transversely of the moving stacks along at least a portion of or along the entire predetermined section of the path. The fluid can but need not be preheated and serves to insure that the sheets are not scorched or seared under the influence of intensive heat during travel between the electrodes of the heating device. The rate of flow of gaseous fluid is preferably adjustable, and such rate preferably increases in the direction of travel of holders.

Each holder may comprise two jaws which are disposed at the opposite sides of the path and at least one of which is movable toward or away from the other jaw to thereby grip and retain or release a stack of sheets therebetween.

The paster which applies adhesive to selected portions of the stacks can be mounted adjacent to the path upstream of the aforementioned path section so that its brush, roll or other suitable applicator means applies thermosetting adhesive to the selected portions (backs) of successive stacks.

The novel features which are considered as characteristic of the invention are set forth in particular in the appended claims. The improved machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
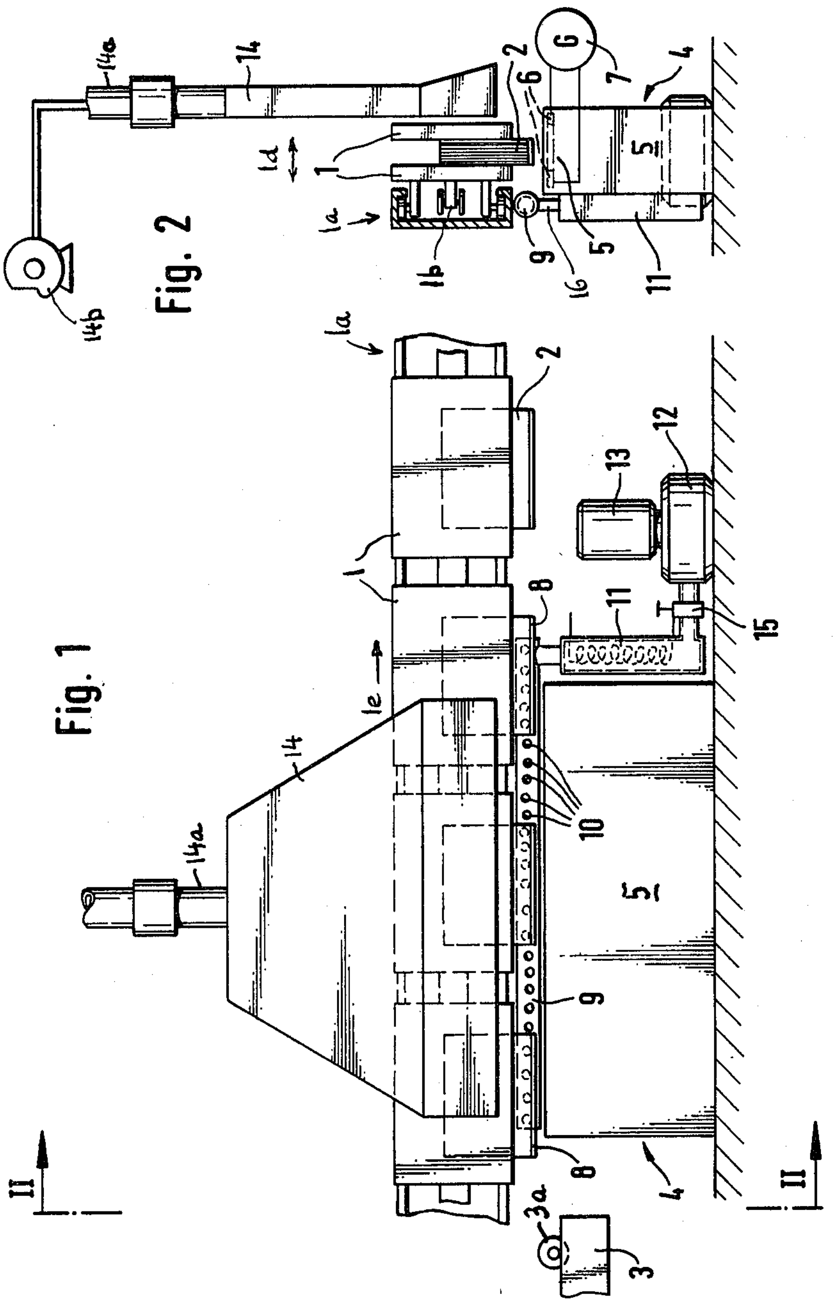
FIG. 1 is a fragmentary schematic elevational view of a bookbinding machine which embodies the invention.
FIG. 2 is a transverse vertical sectional view as seen in the direction of arrows from the line II—II of FIG. 1.

FIG. 1 shows a portion of a bookbinding machine wherein a conveyor 1*a* transports a series of holders 1 for stacks 2 of paper sheets or the like along an endless path including an elongated horizontal stretch which is shown in FIG. 1. Each holder 1 comprises two jaws (see FIG. 2) at least one of which is movable away from or toward the other jaw to respectively release or clamp the corresponding stack 2 above the bottom edge face or back of such stack. It is assumed that the left-hand jaw of the holder 1 shown in FIG. 2 is secured to the endless chain 1*b* of the conveyor 1*a*, and that the right-hand jaw is movable toward and away from the left-hand jaw as indicated by the double-headed arrow 1d. A conveyor of the type adapted for use in the machine of the present invention is disclosed, for example, in U.S. Pat. No. 3,669,246 granted June 13, 1972 to Risi.

The stacks 2 (each of which may consist of several signatures) are inserted or fed between the jaws of successive holders 1 at a station which is located to the left of FIG. 1. Such stacks are thereupon transported past a trimming station (not shown) at which at least the front, bottom and top edge faces of the stacks are trimmed in a manner not forming part of the invention. Successive stacks 2 are then advanced along a paster having a tank 3 for a supply of thermosetting adhesive (e.g., wet glue) and a roller-shaped applicator 3a which dips into the supply of adhesive in the tank 3 and transfers a film 8 of such adhesive to the backs of successive stacks. The paster 3, 3a is located upstream of a heating and conditioning station 4 which is adjacent to an elongated section of the endless path for the holders 1. The chain 1b of the conveyor 1a is assumed to move in the direction indicated by arrow 1e.

The station 4 accommodates means for promoting the setting of adhesive films 8 on the backs of successive stacks 2, and such means includes a box or support 5 for two elongated electrodes or plates 6 forming part of a high-frequency or electronic heating device which further includes a suitable high-frequency generator 7 connected with the electrodes 6 and installed outside of the box 5 (see FIG. 2). The electrodes 6 are located at the opposite sides of and at a level slightly below that section of the path for the holders 1 which extends through the station 4. These electrodes are preferably parallel to each other and to the adjacent stretch of the chain 1b.

The station 4 further accommodates conditioning means which includes a device for establishing and maintaining a stream or curtain of air or other suitable gaseous fluid which flows transversely of the path of movement of the stacks 2 and serves to prevent searing or scorching of paper due to intensive heating action of the high-frequency heating device. The stream establishing and maintaining device includes an elongated tubular member 9 (e.g., a metallic pipe) which is adjacent to one side of the path of movement of stacks 2 through the station 4 and whose length may equal but may also be less than the length of electrodes 6. The pipe 9 is formed with at least one row of preferably equally spaced orifices 10 which discharge streamlets of gaseous medium transversely of the path of movement of stacks 2, preferably in such a way that the streamlets impinge against the adjacent sides of successive stacks in the region of the respective adhesive films 8. The orifices 10 may constitute round holes having identical diameters, i.e., each of these orifices may have the same effective cross-sectional area for discharge of gaseous fluid.

The ends of the pipe 9 are closed and the downstream end of this pipe (i.e., that end which is remote from the paster 3, 3a) is connected with the outlet of a blower 12 which constitutes a means for admitting compressed gaseous fluid into the pipe by way of a suitable conduit 16 which passes through a preheating device 11, e.g., a heat exchanger of any known design. The blower 12 is driven by a motor 13 and draws air from the surrounding atmosphere. The streamlets of gaseous fluid (air) issuing from the orifices 10 of the pipe 9 together form a relatively narrow but along stream or curtain which flows across the path of movement of the stacks 2. Since the pipe 9 offers a certain resistance to the flow of gaseous fluid therein, the quantity of air issuing from the orifices 10 decreases in a direction counter to that indicated by the arrow 1e, i.e., each successive orifice (as considered in the direction of this arrow) discharges a larger quantity of fluid than the preceding orifice. This is desirable and advantageous because the quantity of air in successive increments of the curtain or stream (as considered in the direction of arrow 1e) then increases proportionally with progressing heating of stacks 2 by the electrodes 6 of the high-frequency heating device.

The primary function of the heat exchanger 11 is to expel at least some moisture from the gaseous fluid which flows into the pipe 9 so that the thus conditioned fluid is capable of removing larger quantities of moisture from the heating zone, i.e., from the adhesive films 8 at the backs of successive stacks. The leading edge of the curtain or stream of gaseous fluid flows toward and is drawn into the inlet at the underside of an elongated narrow gas-collecting hood 14 which is adjacent to the path of movement of holders 1 opposite the pipe 9 and whose upper end portion 14a is connected to the suction intake of a motor-driven fan 14b. The outlet of the fan 14b can supply heated gas into the coil or coils of the heat exchanger 11. Alternatively, the heat exchanger 11 may comprise one or more electric heating coils for the fluid in the conduit 16.

The machine further comprises means for regulating the rate of flow of gaseous fluid into the pipe 9. Such regulating means includes a suitable valve 15 which is installed in the conduit 16 upstream of the heat exchanger 11. The valve 15 may be adjusted by hand or in response to signals furnished by a transducer (not shown) which monitors the temperature of stacks 2 and/or the temperature of the air stream.

An important advantage of the improved machine is that the space requirements of the station 4 are but a small fraction of space requirements of stations accommodating conventional heating devices which utilize gas burners. Also, the curtain or stream of gaseous fluid which is formed by streamlets issuing from the orifices 10 of the pipe 9 renders it possible to subject the adhesive films 8 to an intensive heating action whereby the curtain immediately removes moisture which is expelled from such films. In other words, the intensity of heating action which is furnished by the high-frequency heating device including the electrodes 6 and generator 7 can be much more pronounced than the heating action of gas flames but the safety factor is at least as satisfactory as in conventional machines because the curtain of gaseous fluid prevents scorching of sheets even if the heating action is so pronounced that, in the absence of the curtain, the heating device would immediately scorch the sheets which travel through the station 4. Since the rate of flow of gaseous medium from the orifices 10 is adjustable (preferably within a wide range), the operators (or an automatic detector) can invariably select such rate of flow of gaseous medium that the heating device can subject the stacks to a very pronounced heating action to thus insure that the length of the station 4 (as considered in the direction indicated by arrow 1e) is a small fraction of the length of conventional heating stations for thermosetting adhesive.

Another advantage of the improved machine is that the heating action of the high-frequency heating device and the cooling action of the means including the fan 12 and pipe 9 fluctuates very little or not at all so that the instrumentalities at the station 4 require a minimum of supervision.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In a machine for processing stacks which consist of sheets and selected portions of which are coated with a thermosetting adhesive, such as wet glue, particularly in a bookbinding machine, a combination comprising a conveyor including a plurality of holders each arranged to support a stack and to transport the respective stack in a predetermined direction along a predetermined path; means for promoting the setting of adhesive on the stacks in said path, including a heating device having electrode means adjacent to a predetermined section of said path; means for establishing and maintaining a stream of a gaseous fluid which flows transversely of said path along at least a portion of said predetermined section; means for regulating the rate of flow of gaseous fluid across said portion of said predetermined section; and means for conditioning the gaseous fluid ahead of said portion of said predetermined section.

2. A combination as defined in claim 1, wherein said path is an endless path and each of said stacks has a back which is coated with adhesive.

3. A combination as defined in claim 1, wherein each of said holders comprises two jaws at least one of which is movable transversely of said direction toward and away from the other jaw.

4. A combination as defined in claim 1, further comprising a paster adjacent to a second section of said path which is located ahead of said predetermined section, as considered in said direction, and comprises means for applying thermosetting adhesive to said selected portions of successive stacks.

5. A combination as defined in claim 1, wherein said means for establishing and maintaining said stream comprises means for increasing the rate of flow of gaseous fluid in successive increments of said stream, as considered in said predetermined direction.

6. In a machine for processing stacks which consist of sheets and selected portions of which are coated with a thermosetting adhesive, such as wet glue, particularly in a bookbinding machine, a combination comprising a conveyor including a plurality of holders each arranged to support a stack and to transport the respective stack in a predetermined direction along a predetermined path; means for promoting the setting of adhesive on the stacks in said path, including a high-frequency heating device having electrode means adjacent to a predetermined section of said path; and conditioning means including means for establishing and maintaining a stream of a gaseous fluid which flows transversely of said path along at least a portion of said predetermined section, said means for establishing and maintaining said stream comprising an elongated tubular member extending along one side of said portion of said predetermined section and means for admitting compressed gaseous fluid into one end of said tubular member, said tubular member having orifices arranged to discharge streamlets of gaseous fluid transversely of and across said path so that such streamlets impinge upon successive stacks in said path in the region of the selected portions of the stacks.

7. A combination as defined in claim 6 wherein said one end of said tubular member is the downstream end thereof, as considered in said direction.

8. A combination as defined in claim 6, wherein said orifices are substantially equally spaced from each other, as considered in said direction, and have at least substantially equal effective gas-discharging areas.

9. A combination as defined in claim 6, further comprising means for heating the gaseous fluid prior to admission into said tubular member.

* * * * *